Sept. 3, 1929.  W. E. ADDICKS  1,726,639
BATTERY CHARGING SYSTEM
Filed Oct. 19, 1925   2 Sheets-Sheet 1

INVENTOR
Walter E. Addicks
BY
ATTORNEY

Sept. 3, 1929.  W. E. ADDICKS  1,726,639
BATTERY CHARGING SYSTEM
Filed Oct. 19, 1925   2 Sheets-Sheet 2

INVENTOR.
Walter E. Addicks
BY
ATTORNEY

Patented Sept. 3, 1929.

1,726,639

UNITED STATES PATENT OFFICE.

WALTER E. ADDICKS, OF NEW YORK, N. Y., ASSIGNOR, BY MESNE ASSIGNMENTS, TO CUTLER-HAMMER, INC., OF MILWAUKEE, WISCONSIN, A CORPORATION OF DELAWARE.

BATTERY-CHARGING SYSTEM.

Application filed October 19, 1925. Serial No. 63,243.

This invention relates to battery charging systems, and more particularly to automatic shut-down control for motor-generator battery charging systems.

In certain installations where frequent interruptions of the power circuit are encountered it is desired to so arrange the entire charging equipment that in case of temporary failure of power line voltage the battery charging operations will be temporarily interrupted but resumed after normal conditions have returned. With this type of equipment the motor-generator set must be so arranged with the motor controller, that it will restart upon return of motor line voltage after temporary failure. Furthermore, the charging equipment must be so arranged that upon failure of line voltage, which would result in reversal of the charging current, the batteries will be disconnected from the generator and thus taken off charge. In addition the charging equipment must provide for reconnection of the batteries to the generator for further charging after return of normal voltage conditions.

In other installations where the failure of line voltage is infrequent, the charging equipment is so arranged that operation of the motor-generator set and charging of the batteries will be stopped upon failure of line voltage, and not automatically resumed after return of normal conditions. The individual battery charging switches or controllers need not be arranged for automatic reclosure, as in the fully automatic devices above mentioned. Obviously the difference between the two systems resides primarily in the motor starter, which must be arranged for two-wire control in the first case covering fully automatic equipment, and which must either be a hand starter or arranged for three wire control in the second case. When the motor starter is arranged for two wire control a tripping relay of the non-resetting type must be employed, whereas when the motor starter is either a hand starter or arranged for three wire control the tripping relay need not be of the non-resetting type. The aforementioned difference is of course reflected in the nature of the shutdown device.

If automatic restarting of the motor generator set is required, the shutdown device must be so arranged that it will not operate upon temporary failure of voltage, but will operate after termination of the charge of all batteries with normal voltage conditions obtaining. The charging equipment is so arranged that all battery charging switches will assume the same positions after temporary failure of voltage as they do after termination of the charge of all batteries, whereas the distinction between these two fundamentally similar conditions is obtained by employment of a time limit relay, which will not operate to shut down the set upon failing voltage, but will operate only when the voltage remains at or near its normal value for an appreciable period of time after interruption of the battery charging circuits. However, where non-automatic equipment is employed and the motor-generator set need not be restarted the tripping device for interrupting the motor circuit can operate even after temporary failure of voltage. Hence in this latter case there is no necessity for distinguishing between opening of switches due to temporary failure of voltage and opening of switches due to termination of the charge.

As will hereinafter appear provision is likewise made for distinguishing between the open circuit condition of the battery charging circuits with the motor-generator set running prior to the start of the charge, and the similar condition after voltage failure or final termination of the charge.

An object of my invention is to provide for accomplishment of the aforementioned desirable results in a simple and efficient manner.

Another object is to provide improved means for automatically controlling a motor-generator set employed for battery charging.

Another object is to provide means adapted to automatically distinguish between given electrical conditions in the battery charging equipment.

Another object is to provide means for automatically interrupting the battery charging circuits under conditions of voltage failure and for automatically reincluding the batteries in circuit upon return of normal voltage conditions.

Another object is to provide a battery charging system having means for starting and automatically maintaining operation of the motor-generator set prior to completion of a battery charging circuit or circuits.

Other objects and advantages of the invention will hereinafter appear.

Referring to the accompanying drawing, in which I have illustrated various embodiments which the invention may assume in practice, Figure 1 is a diagrammatic and schematic view of one form of battery charging system constructed and arranged in accordance with my invention, employing a so-called automatic starter for the motor-generator set.

Figure 1:
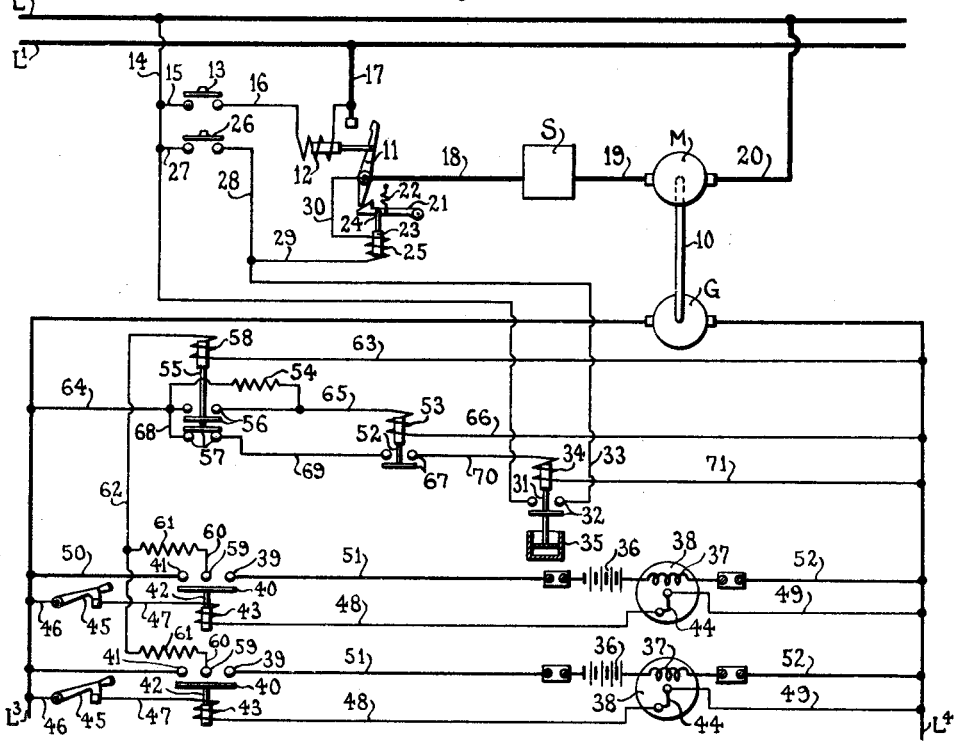

Referring first to the system illustrated in Fig. 1, I have shown a motor-generator set comprising a motor M to be supplied with power from lines $L^1$, $L^2$ and suitably connected as indicated at 10 to a generator G for driving the latter. The motor M is provided with an automatic starter S, a normally open single-pole switch 11 being adapted when closed to complete the motor circuit. Switch 11 is provided with a closing coil 12, adapted to be energized upon closure of a normally open push-button switch 13, the energizing circuit extending from line $L^2$ by conductors 14 and 15 through switch 13, thence by conductor 16 through coil or winding 12, and by conductor 17 to line $L^1$. The motor circuit thus established may be traced to line $L^1$ by conductor 17 through switch 11, by conductor 18 through starter S, thence by conductor 19 through motor M, and by conductor 20 to line $L^2$.

Switch 11 is provided with a latch 21 for holding the same in closed position, said latch being biased to operative position by a spring 22. Latch 21 is also provided with means for tripping the same against the action of spring 22, said means preferably comprising a metallic core member 23 pivoted at 24, and a coil 25 adapted when energized to effect retraction of latch 21 and consequent opening of switch 11. Assuming closure of switch 11 as aforedescribed, tripping coil 25 may be energized by closure of a nomally open push-button switch 26, the energizing circuit extending from line $L^2$ by conductors 14 and 27 through switch 26, by conductors 28 and 29 through coil 25, by conductor 30 through switch 11, and thence by conductor 17 to line $L^1$. Switch 11 upon opening interrupts the motor circuit, stops operation of the motor-generator set, and remains open to prevent restarting.

I also provide means for effecting automatic energization of tripping coil 25, said means comprising a time limit relay 31 having normally open contacts 32 adapted when closed to provide an energizing circuit extending from line $L^2$ by conductor 14 through said contacts 32, by conductors 33 and 29 through coil 25, and thence to line $L^1$ as previously traced. Closure of relay 31 is effected through energization of its winding 34 in the manner hereinafter described, but subject to delay by a dashpot 35 or the like for a purpose hereinafter set forth.

One or more battery charging devices are adapted to be included in circuit with the generator lines $L^3$, $L^4$. In the diagrammatic illustration the numeral 36 indicates a battery to be charged, one terminal of the battery being connected to line $L^4$ through coil 37 of an ampere-hour-meter 38 of usual construction, the other terminal thereof being adapted for connection with line $L^3$ upon closure of normally open contacts 39, 40 and 41 of a relay 42. Closure of relay 42 is effected through energization of its shunt winding 43,—the latter being subject to control by normally closed contacts 44 of meter 38. Thus, with the motor-generator set in operation and a battery 36 connected as illustrated, the battery charging operation may be initiated by closure of switch 45, which effects energization of winding 43 through a circuit extending from line $L^3$ by conductor 46 through switch 45, by conductor 47 through winding 43, by conductor 48 through normally closed contacts 44, and thence by conductor 49 to line $L^4$. Thereupon relay 42 closes to provide a battery charging circuit, which may be traced from line $L^3$ by conductor 50, contacts 41, 40 and 39, by conductor 51 through battery 36, thence through coil 37 of meter 38, and by conductor 52 to line $L^4$.

The aforedescribed battery charging circuit will be automatically maintained until the battery is fully charged, at which time the coil 37 of the ampere-hour-meter functions in the well known manner to effect opening of contacts 44 and consequent opening of relay 42 due to deenergization of its winding 43, thereby interrupting the charging circuit. Voluntary interruption of the charging circuits may be effected individually at any time by opening of the respective switches 45. As will be obvious, the battery charging circuits will be automatically interrupted upon failure of generator voltage such as to permit deenergization of the windings 43 of the respective relays 42, assuming low battery voltages, whereas if desired a reverse current or series coil may be provided for each relay 42, in addition to the shunt coil 43, to insure interruption of the battery charging circuits under all conditions of voltage failure. Such voltage failure might be occasioned by stopping of the motor-generator set as a result of operation of push-button switch 26 or as a result of failure of motor line voltage, or it might be due to failure of generator voltage only for any reason. In many cases it is desirable to prevent automatic disconnection of the motor-generator set upon voltage failure, especially when the failure of voltage is only a temporary condition. In such cases it is also desirable to provide for automatic restoration of the battery charging circuit or circuits upon return of normal voltage conditions. The means now to be described, in conjunction with the devices aforementioned, are adapted for accomplishment of the desirable results above set forth, among others.

Thus, I have shown a normally open relay 52 having an operating and holding winding 53. This winding is connected permanently across lines $L^3$ and $L^4$ in series with a suitable resistance 54. The resistance 54 is of such value that winding 53 will not be sufficiently energized to operate relay 52 even at maximum generator voltage with said resistance in circuit. However, upon short-circuiting of resistance 54, winding 53 will be energized sufficiently to close relay 52 and will hold the latter closed even at the normal low value of generator voltage, if the short-circuit is removed. The means for short-circuiting resistance 54 comprises a relay 55 having normally open "up" contacts 56 and normally closed "down" contacts 57, said relay having an operating and holding winding 58 adapted when energized to effect opening of normally closed contacts 57 and subsequent closure of normally open contacts 56. Each of the individual battery charging relays 42 is provided with an auxiliary contact 59, whereby upon closure of one or more of said relays in the manner aforedescribed an energizing circuit for winding 58 is established,—which circuit may be traced from line $L^3$ by conductor 50 through contacts 41, 40 and 59, by conductor 60 through a suitable current limiting or protective resistance 61, by conductor 62 through winding 58 and thence by conductor 63 to line $L^4$.

Contacts 56 upon closure will short-circuit resistance 54 and thus provide for operating energization of winding 53, by a circuit extending from line $L^3$ by conductor 64 through closed contacts 56, by conductor 65 through said winding 53, and by conductor 66 to line $L^4$. Relay 52 will thereupon operate to close its normally open contacts 67, and said contacts will be held closed by winding 53 notwithstanding reinclusion in circuit with the latter of resistance 54 due to reopening of contacts 56 of relay 55. As aforedescribed, however, winding 58 of relay 55 will remain energized until all of the individual batteries are fully charged, under normal conditions of generator voltage; whereas upon failure of said voltage the relay 55 will drop to effect reclosure of normally closed contacts 57. An energizing circuit for the winding 34 of relay 31 will thus be provided,—said circuit extending from line $L^3$ by conductors 64 and 68 through reclosed contacts 57 of relay 55 by conductor 69 through closed contacts 67 of relay 52, by conductor 70 through winding 34, and by conductor 71 to line $L^4$. Relay 31 thereupon tends to close its normally open contacts 32 to provide an energizing circuit for the tripping coil 25 of relay 11, as heretofore traced. Dashpot 35, however, retards the closing movement of relay 31, so that if the failure of generator voltage is only temporary, normal voltage may be restored prior to complete closing movement of said relay, in which event the winding 58 of relay 55 will be again sufficiently energized to effect opening of contacts 57, thereby interrupting the energizing circuit of coil 34 as described. Moreover, a similar result is obtained in the event of a prolonged period of voltage failure, inasmuch as the closing movement of relay 31 is slowed up as a consequence of the gradually decreasing voltage, until finally the relay stops entirely. The aforementioned tripping of switch 11 is thus prevented, so that upon return of normal voltage the various devices will assume their normal charging positions.

It is to be noted that the normally open and normally closed contacts of relay 55 cooperate with relay 52 to positively prevent closure of contacts 67 of the latter prior to initial opening of contacts 57 of the former, thus insuring against premature energization of the winding 34 of relay 31. The time limit relay 31 functions, as aforedescribed, only to prevent stopping of the motor-generator set under the aforementioned conditions of failure of voltage.

Similarly, completion of the charging operation with respect to each and all of the batteries, and consequent opening of the last individual battery charging relay or switch 42, effects interruption of the energizing circuit of winding 58 of relay 55. Thereupon the contacts 57 of relay 55 reclose to complete the energizing circuit of winding 34 (contacts 67 of relay 52 remaining closed as aforedescribed) thus causing contacts 32 to close after a time interval for completing automatically the aforementioned energizing circuit of tripping coil 25, which effects opening of switch 11 and brings the motor-generator system to rest. As aforeindicated the equipment also resets itself completely for the next cycle of operations. It will thus be apparent that I have provided a battery charging system which is fully automatic in character.

Figure 2:
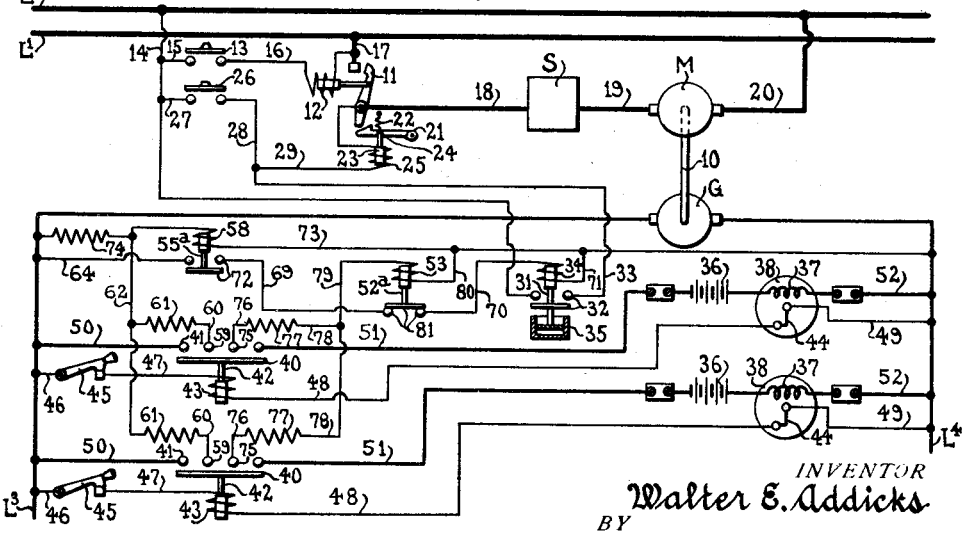
Fig. 2 is a similar view of a slightly modified arrangement.

In Fig. 2 I have illustrated a modified form of full automatic battery charging equipment, which will now be described,— the corresponding parts in Figs. 1 and 2 being designated by like characters of reference. As will be apparent, the construction and arrangement of the motor-generator system and the automatic starter are the same as the corresponding parts illustrated in Fig. 1, and repeated description thereof is deemed unnecessary. In Fig. 2, however, the relay 55ª is provided with but one set of contacts 72 which are normally open. With the motor-generator set in operation, and assuming completion of one or more battery charging circuits in the manner aforedescribed, an energizing circuit for winding 58 of relay 55ª is provided, which circuit may be traced from line L³ by conductor 50 through contacts 41 and 40 and auxiliary contact 59 of switch or relay 42, by conductor 60 through a suitable protective resistance 61, by conductor 62 through winding 58, and thence by conductor 73 to line L⁴. Permanently connected in series with winding 58 is a resistance 74, said resistance having characteristics corresponding to resistance 54 in Fig. 1; namely, to prevent closing energization of winding 58 even at maximum generator voltage, but permitting sufficient energization of said winding to hold relay 55ª closed even at the normal low value of generator voltage with said resistance in circuit. Relay 55ª will therefore close and will remain closed even though all of the battery charging switches 42 are opened due to completion of the charging operation.

Each of the battery switches 42 is provided with a second auxiliary contact 75 adapted upon closure of one or more of said switches to provide an energizing circuit for the winding 53 of normally closed relay 52ª,—which circuit may be traced from line L³, by conductor 50 through contacts 41, 40 and 75, by conductor 76 through a suitable protective resistance 77, by conductors 78 and 79 through winding 53 and by conductors 80 and 73 to line L⁴. Contacts 81 of relay 52ª will thereupon open and will be held open until the switches 42 are all reopened.

The winding 34 of time limit relay 31 is connected across the generator lines L³ and L⁴ in series with the normally closed contacts 81 of relay 52ª and normally open contacts 72 of relay 55ª. Winding 34 will therefore not be energized unless contacts 81 and 72 are simultaneously closed. Thus, upon placing the first battery on charge the relay 55ª is closed and the relay 52ª is opened, which leaves the circuit of winding 34 of relay 31 in the same condition as before any battery was placed on charge. Without any interlock of any kind between the relays 55ª and 52ª there might be a moment in which the contacts of both relays would be closed and at this instant the relay 31 would operate if it were not for the time limit feature. In addition to providing an interlock for the relays 55ª and 52ª during starting of the battery charging operation, as just described, the time element relay 31 functions to prevent interruption of operation of the motor-generator set under conditions of failure of voltage, in the manner described in connection with Fig. 1. However, upon opening of the last battery switch 42 due to completion of the respective charges, relay 52ª will be deenergized and its contacts 81 closed whereas relay 55ª will remain energized for continued closure of its contacts 72. The energizing circuit for winding 34 of relay 31 will thus be completed, which circuit may be traced from line L³, by conductor 64 through contacts 72, by conductor 69 through contacts 81, by conductor 70 through said winding 34, and by conductors 71 and 73 to line L⁴. Contacts 32 of relay 31 will thereupon be closed after a time interval to complete the energizing circuit of tripping coil 25 to effect opening of switch 11, thereby bringing the motor-generator set to rest. It will therefore be apparent that the devices illustrated in Figs. 1 and 2 are quite similar in construction and arrangement, whereas the functions of said devices as a whole are also substantially the same. As aforeindicated, however, the time element relay in Fig. 2 additionally functions to prevent closure of the contacts of the latter due to possible simultaneous closure of contacts 72 and 81 during initiation of the charging operation.

An important feature of my invention resides in the fact that the battery charging system automatically resets itself after each operation, thus simplifying the system and reducing to a minimum the amount of skill required in manipulation thereof. Moreover, it will be apparent that by the arrangement described the individual batteries when fully charged may be replaced with other batteries to be charged without interrupting the charge of the remaining batteries,—thus permitting continuous operation of the motor-generator set for charging purposes. Another important feature of the invention resides in the fact that no time limit is imposed between starting the motor-generator set and placing the first battery on charge. Also, no manual operation is required to distinguish between the preliminary starting conditions and the later running conditions.

Figure 3:
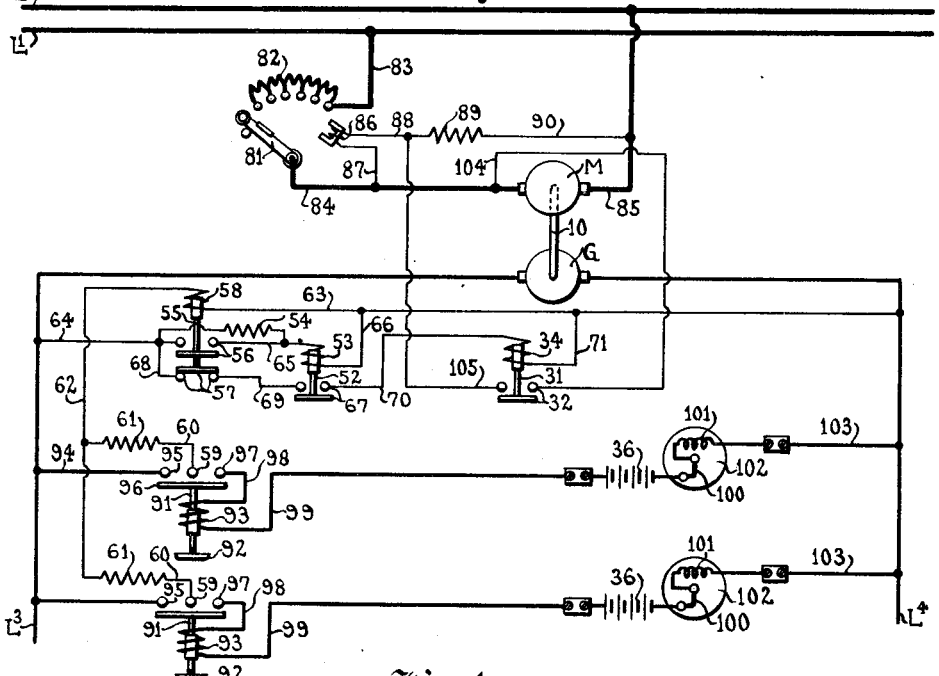
Fig. 3 illustrates a battery charging system employing a manual starter for the motor-generator set.
Figure 4:
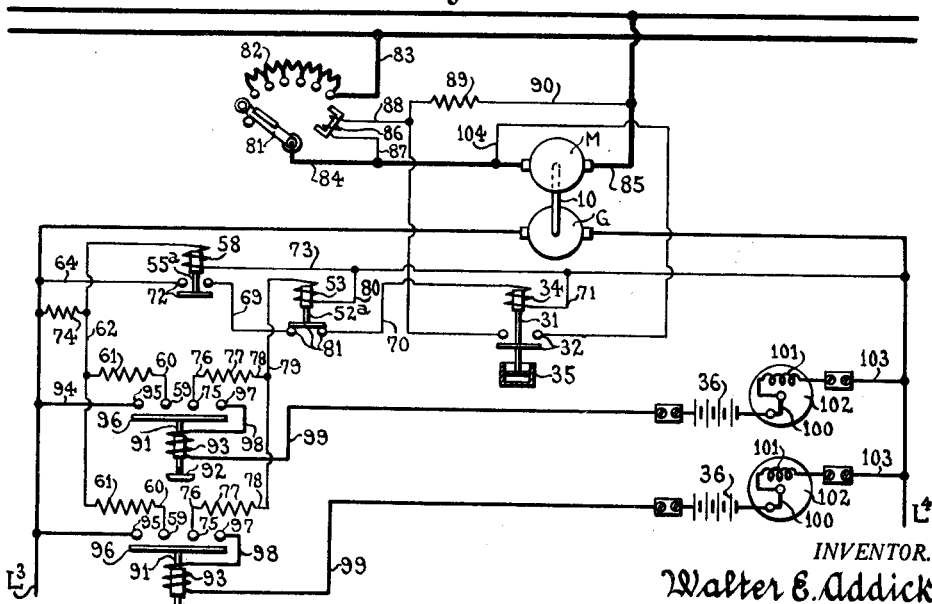
Fig. 4 is a modified form of the system illustrated in Fig. 3.

The devices illustrated in Figs. 3 and 4 are especially adapted for installations where frequent failure of line voltage is not contemplated, and thus provision for automatic restarting of the motor generator set after voltage failure is unnecessary or undesirable. Referring to Fig. 3, I have shown a motor-generator set comprising a motor M and generator G having a suitable connection 10 therebetween. Motor M is adapted to be connected across lines $L^1$ and $L^2$ through a suitable manual starting device, which may comprise a contact arm 81 biased to circuit breaking position and adapted when manually operated to first include and then gradually exclude all of the starting resistance 82. Assuming initial movement of arm 81, the motor circuit may be traced from line $L^1$ by conductor 83 through starting resistance 82 and arm 81, by conductor 84 through motor M, and thence by conductor 85 to line $L^2$. Upon full movement of arm 81 resistance 82 is excluded and the motor connected directly across the line, a no-voltage release coil 86 being adapted to hold arm 81 in the last mentioned position pending failure of the motor line voltage, or until said coil 86 is short-circuited in the manner hereinafter set forth. The energizing circuit of coil 86 may be traced from line $L^1$ by conductor 83 through contact arm 81, by conductors 84 and 87 through said coil 86, by conductor 88 through a suitable resistance 89, and by conductors 90 and 85 to line $L^2$.

Each battery 36 is provided with a charging circuit adapted to be individually closed by a manually operable switch 91 having a suitable handle 92, and each of said switches 91 is provided with a holding winding 93 in series with the battery 36. Assuming closure of a battery charging switch 91, the charging circuit may be traced from line $L^3$ by conductor 94, through contacts 95, 96 and 97, by conductor 98 through winding 93, as aforedescribed, by conductor 99 through battery 36, thence through normally closed contacts 100 under the control of an ampere-hour-meter 102, through the operating winding 101 of the latter, and by conductor 103 to line $L^4$. While I have shown the contacts 100 of the ampere-hour-meter in series with the battery charging circuit, it is to be understood that the controlling effect thereof may be relayed in any suitable manner well known in the art.

The relays for effecting automatic shutdown of the motor-generator set upon completion of the charge of the last battery are identical with the relays illustrated in Fig. 1, and hence will be given corresponding reference numerals. Thus, each of the battery switches 91 is provided with an auxiliary contact 59, whereby upon closure of any one or more of said switches an energizing circuit is provided for the winding 58 of relay 55; which circuit may be traced from line $L^3$ by conductor 94, through contacts 95, 96 and 59 of said switch, by conductor 60 through a suitable protective resistance 61, by conductor 62 through said winding 58, and by conductor 63 to line $L^4$. Relay 55 thereupon responds to effect opening of contacts 57 and closure of contacts 56, thus short-circuiting resistance 54, to provide an energizing circuit for winding 53; which circuit may be traced from line $L^3$ by conductor 64 through contacts 56, by conductor 65 through winding 53, and thence by conductors 66 and 63 to line $L^4$. Relay 52 thereupon operates to effect closure of contacts 67, but subject to prior opening of contacts 57 of relay 55, as aforedescribed. This interlock is particularly necessary in view of the fact that relay 31 is of the instantaneous type, the dashpot or the like having been omitted. As described in connection with Fig. 1, the resistance 54 which prevents initial operation of relay 52 nevertheless permits sufficient energization of the latter to hold it in closed position.

Thus upon completion of the charge of all batteries each of the switches 91 is returned to its normal open position due to deenergization of the holding coil 93 by operation of the controlling contacts of the ampere-hour-meter. Opening of the last battery switch effects deenergization of winding 58 of relay 55 in an obvious manner, thus permitting reclosure of contacts 57 and thereby completing the energizing circuit of winding 34 of relay 31. Said circuit may be traced from line $L^3$ by conductors 64 and 68, through contacts 57, conductor 69 and contacts 67, by conductor 70 through winding 34, and thence by conductors 71 and 63 to line $L^4$. Relay 31 then responds to effect closure of contacts 32, thereby short-circuiting the coil 86 by a circuit extending from line $L^1$, by conductor 83 through arm 81, by conductors 84 and 104 through said contacts 32, by conductors 105 and 88 through resistance 89, and thence by conductors 90 and 85 to line $L^2$. Coil 86 is thus deenergized to permit return of arm 81 to the biased position illustrated whereby the motor circuit is interrupted and the motor-generator set brought to rest. As in the previously described devices, the various parts of the battery charging equipment are automatically returned to the initial positions illustrated, thereby setting the apparatus for another cycle of operation.

As aforeindicated the battery charging device illustrated in Fig. 3 is adapted to be automatically shut-down even though the failure of voltage is only temporary, and manual operation of the starter 81 and the various switches 91 is required for resumption of the charging operation after return of normal voltage conditions.

The battery charging equipment illustrated in Fig. 4 is of the type illustrated in Fig. 3; that is to say, it provides for automatic shut-down of the motor-generator set upon complete charging of all batteries under normal voltage conditions, but requires manual restarting thereof after interruption of operation of the motor-generator set for any reason, such as temporary failure of voltage or the like. The difference resides mainly in the construction and arrangement of the controlling relays 55ª, 52ª and 31, the latter relay being provided with a dashpot 35 or other timing element to provide a suitable interlock between the other relays, in the manner described in connection with Fig. 2. Also, as in Fig. 2, each battery switch 91 is provided with a second auxiliary contact 75 and corresponding protective resistance 77. The various elements of the device shown in Fig. 4 having been specifically described in Figs. 2 and 3, it is believed that a description of the operation of said device will be sufficient. Thus, the motor-generator set is started in operation in the manner described in connection with Fig. 3, and assuming completion of one or more battery charging circuits in the manner aforedescribed, including closure of the switches 91, an energizing circuit for winding 58 of relay 55ª is provided, which circuit may be traced from line L³, by conductor 94, through contacts 95, 96 and 59, by conductor 60 through protective resistance 61, by conductor 62 through winding 58, and by conductor 73 to line L⁴. This effects closure of normally open contacts 72 of said relay. An energizing circuit for winding 53 of relay 52ª is simultaneously provided, which circuit may be traced from line L³, by conductor 94, through contacts 95, 96 and 75, by conductor 76 through protective resistance 77, by conductors 78 and 79 through winding 53, and by conductors 80 and 73 to line L⁴.

In view of the possible closure of contacts 72 prior to opening of contacts 81 (thus effecting energization of winding 34 of relay 31), I provide the relay 31 with a suitable time limit device, such as the dashpot 35, thus insuring against closure of contacts 32, during initiation of the battery charging operation. A suitable resistance 74 is arranged permanently in series with winding 58 (as in Fig. 2), thus providing sufficient energization of the latter to maintain contacts 72 in closed position, notwithstanding opening of all of the individual battery charging switches 91 due to completion of the several charges. However, upon opening of the last switch 91, the energizing circuit of winding 53 is interrupted, thus permitting reclosure of contacts 81 of relay 52ª and completing the energizing circuit of winding 34. Said circuit may be traced from line L³, by conductor 64, through contacts 72, by conductor 69 through contacts 81, by conductor 70 through said winding 34, and by conductors 71 and 73 to line L⁴. Contacts 32 of relay 31 are thereupon closed after a time interval to short-circuit the coil 86 in the manner set forth in connection with Fig. 3, thus bringing the motor-generator set to rest.

As will be apparent, failure of motor line voltage results in all of the battery switches 91 falling open, with consequent closure of relay 52ª. Winding 34 of relay 31 will then be energized if winding 58 of relay 55ª is not already open because of failing voltage. In all probability, however, the combination of a time limit and a failing voltage would prevent relay 31 from closing, and the motor-generator set would not be shut down through the action of this device. The motor starter, however, would operate independently to disconnect the motor and the result would be the same as if relay 31 had closed. All relays will, moreover, be returned to their respective normal positions and the system will reset itself for further operation. It is to be noted that the time limit device 35 on relay 31 of Fig. 4 functions solely to prevent closure of said relay during initiation of the battery charging operation, as aforedescribed.

While I have illustrated and described various embodiments of my invention, it will be apparent to those skilled in the art that other modifications may be made therein without departing from the spirit and scope of my invention as defined herein and in the appended claims.

What I claim and desire to secure by Letters Patent is:

1. A controller for a multiplicity of individually controlled current consuming devices supplied with current from a motor-generator set, including means to disconnect the motor from the line when all the devices have been disconnected, and means for delaying the action of said last mentioned means.

2. In a battery charging system, the combination with a motor and a generator to be driven thereby, of means for completing and maintaining the motor circuit, means for including a battery in circuit with said generator to be charged thereby, and means adapted to be preset by said last mentioned means for effecting interruption of the motor circuit but subject to a predetermined delay.

3. In a battery charging system, the combination with a motor and a generator to be driven thereby, of means for completing and maintaining the motor circuit, a relay adapted when energized and closed to effect interruption of the motor circuit, means for individually including a plurality of batteries in circuit with said generator to be charged thereby, means for automatically excluding said batteries from circuit individually upon attainment of a given state of charge, and means adapted upon exclusion of the last battery from circuit for effecting energization and closure of said relay.

4. In a battery charging system, the combination with a motor and a generator to be driven thereby, of means for completing and maintaining the motor circuit, a relay adapted when energized and closed to effect interruption of the motor circuit, means for individually including a plurality of batteries in circuit with said generator to be charged thereby, means for automatically excluding said batteries from circuit individually upon attainment of a given state of charge, and means adapted upon exclusion of the last battery from circuit for effecting energization and closure of said relay, said last mentioned means comprising a relay having a winding to be energized only during charging of one or more batteries.

5. In a battery charging system, the combination with a motor and a generator to be driven thereby, of means for completing and maintaining the motor circuit, a relay adapted when energized and closed to effect interruption of the motor circuit, means for individually including a plurality of batteries in circuit with said generator to be charged thereby, means for automatically excluding said batteries from circuit individually upon attainment of a given state of charge, and means adapted upon exclusion of the last battery from circuit for effecting energization and closure of said relay, said last mentioned means comprising a relay having a winding to be energized only during charging of one or more batteries, and another relay having a winding the energizing circuit of which is maintained after exclusion of all batteries from circuit.

6. In a battery charging system, the combination with a motor-generator set, of means for initiating operation thereof, means for connecting one or more batteries in circuit with said generator to be charged thereby, and means for interrupting operation of said motor-generator set upon disconnection of the last battery from circuit, said means comprising a plurality of relays, operating energization of one of said relays being dependent upon conditions of simultaneous energization and deenergization, respectively, of other of said relays.

7. In a battery charging system, the combination with a motor-generator set, of means for initiating operation thereof, means for connecting one or more batteries in circuit with said generator to be charged thereby, means for interrupting operation of said motor-generator set upon disconnection of the last battery from circuit, said means comprising a plurality of relays, operating energization of one of said relays being dependent upon conditions of simultaneous energization and deenergization, respectively, of other of said relays, and means for insuring against operation of said first mentioned relay during initiation of the battery charging operation.

8. In a battery charging system, the combination with a motor-generator set, of means for initiating operation thereof, means for connecting one or more batteries in circuit with said generator to be charged thereby, means for automatically disconecting the batteries from circuit individually upon completion of the charge thereof, and means for interrupting operation of said motor-generator set upon disconnection of the last battery from circuit, said means comprising a plurality of relays, operating energization of one of said relays being dependent upon conditions of simultaneous energization and deenergization, respectively, of other of said relays.

9. In a battery charging system, the combination with a motor and a generator to be driven thereby, of a starting device for completing and maintaining the circuit connections of said motor, a plurality of batteries and switches for individually connecting the same in circuit with said generator to be charged thereby, means for automatically opening each switch upon completion of the charge of its respective battery, means adapted upon opening of the last switch to effect interruption of the motor circuit connections, said means comprising a plurality of relays, certain of said relays being arranged to be energized upon closure of one or more of said switches, and means for maintaining energization of one of said relays after opening of all of said switches.

10. In a battery charging system, the combination with a motor and a generator to be driven thereby, of a starting device for completing and maintaining the circuit connections of said motor, a plurality of batteries and switches for individually connecting the same in circuit with said generator to be charged thereby, means for automatically opening each switch upon completion of the charge of its respective battery, means adapted upon opening of the last switch to effect interruption of the motor circuit connections, said means comprising a relay having normally open contacts and a relay having normally closed contacts, means for effecting closure of said normally open contacts and opening of said normally closed contacts upon closure of at least one of said switches, and means adapted upon opening of all of said switches to maintain closure of said normally open contacts while permitting reclosure of said normally closed contacts.

11. In a battery charging system, the combination with a motor and a generator to be driven thereby, of a starting device for completing and maintaining the circuit connections of said motor, a plurality of batteries and switches for individually connecting the same in circuit with said generator to be charged thereby, means for automatically opening each switch upon completion of the charge of its respective battery, means adapted upon opening of the last switch to effect interruption of the motor circuit connections, said means comprising a relay having normally open contacts and a relay having normally closed contacts, means for effecting closure of said normally open contacts and opening of said normally closed contacts upon closure of at least one of said switches, means adapted upon opening of all of said switches to maintain closure of said normally open contacts while permitting reclosure of said normally closed contacts, and another relay having contacts adapted to control said starting device, said last mentioned relay having an operating winding to be energized for operation thereof upon simultaneous closure of the contacts of said first mentioned relays.

12. In a battery charging system, the combination with a motor and a generator to be driven thereby, of a starting device for completing and maintaining the circuit connections of said motor, a plurality of batteries and switches for individually connecting the same in circuit with said generator to be charged thereby, means for automatically opening each switch upon completion of the charge of its respective battery, means adapted upon opening of the last switch to effect interruption of the motor circuit connections, said means comprising a relay having normally open contacts and a relay having normally closed contacts, means for effecting closure of said normally open contacts and opening of said normally closed contacts upon closure of at least one of said switches, means adapted upon opening of all of said switches to maintain closure of said normally open contacts while permitting reclosure of said normally closed contacts, and another relay having contacts adapted to control said starting device, said last mentioned relay having an operating winding to be energized for operation thereof upon simultaneous closure of the contacts of said first mentioned relays, but subject to a predetermined delay.

13. In a battery charging system, the combination with a motor-generator set, of means for initiating operation thereof, a plurality of switches for including batteries in circuit with said generator to be charged thereby, individual operating means for said switches to automatically effect disconnection of the respective batteries upon completion of the charge thereof, a relay adapted upon operation thereof to effect interruption of operation of the motor-generator set, an operating winding for said relay, a plurality of relays for controlling the energizing circuit of said winding, operating windings for said last mentioned relays, and means for effecting energization of said windings upon closure of at least one of said switches, energization of one of said windings being thereafter maintained independently of all of said switches.

14. In a battery charging system, the combination with a motor and a generator to be driven thereby, of a starting device for completing and maintaining the circuit connections of said motor, a plurality of batteries and switches for individually connecting the same in circuit with said generator to be charged thereby, means for automatically disconnecting said batteries from circuit upon failure of generator voltage, means for automatically disconnecting the respective batteries from circuit upon completion of the charge thereof, means for effecting interruption of the motor circuit connections upon disconnection of said batteries in the manner last mentioned, and means for preventing interruption of said motor circuit connections under conditions of failure of generator voltage.

15. In a battery charging system, the combination with a motor and a generator to be driven thereby, of a starting device for completing and maintaining the circuit connections of said motor, a plurality of batteries and switches for individually connecting the same in circuit with said generator to be charged thereby, means for automatically disconnecting said batteries from circuit upon failure of generator voltage, means for automatically disconnecting the respective batteries from circuit upon completion of the charge thereof, means for effecting interruption of the motor circuit connections upon disconnection of said batteries in the manner last mentioned, means for preventing interruption of said motor circuit connections under conditions of failure of generator voltage, and means for automatically reincluding the batteries in circuit upon return of normal voltage conditions.

In witness whereof, I have hereunto subscribed my name.

WALTER E. ADDICKS.